Dec. 23, 1924.

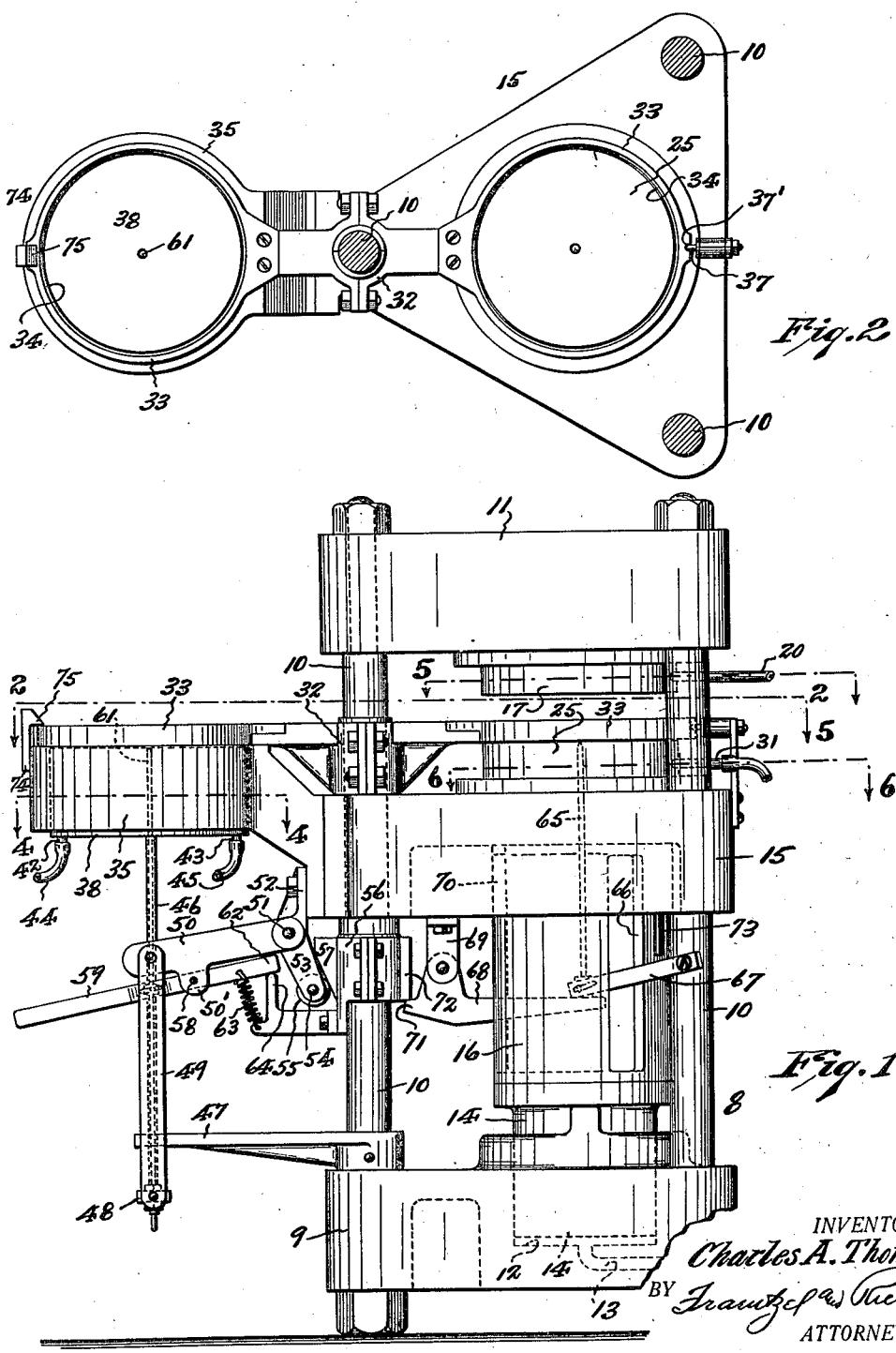

C. A. THOMSON 1,520,214

MACHINE FOR MOLDING PHONOGRAPH RECORDS

Filed Nov. 2, 1921   3 Sheets-Sheet 2

INVENTOR.
Charles A. Thomson,
BY
Fraentzel and Richards
ATTORNEYS.

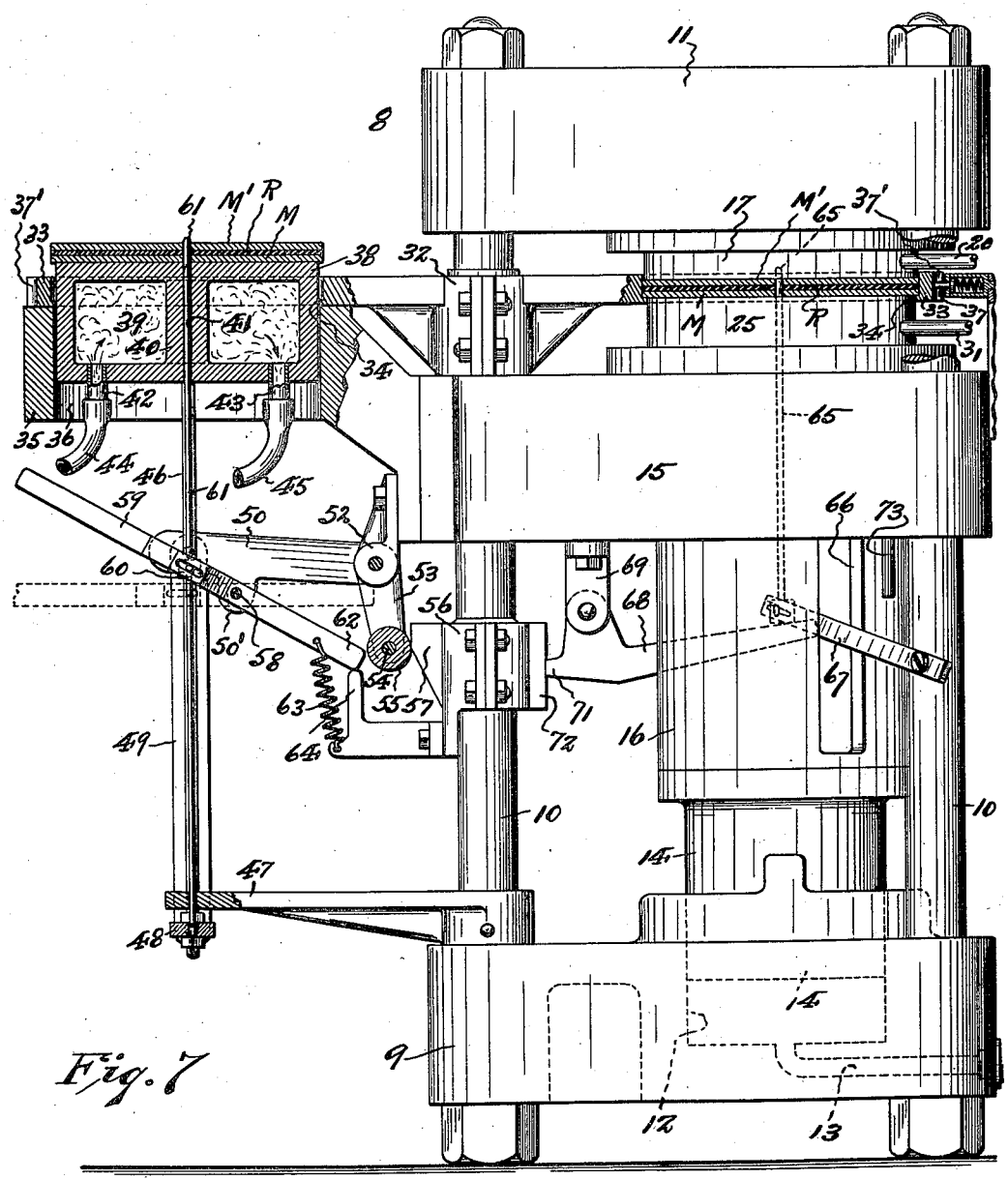

Patented Dec. 23, 1924.

1,520,214

UNITED STATES PATENT OFFICE.

CHARLES A. THOMSON, OF BELLEVILLE, NEW JERSEY.

MACHINE FOR MOLDING PHONOGRAPH RECORDS.

Application filed November 2, 1921. Serial No. 512,165.

*To all whom it may concern:*

Be it known that I, CHARLES A. THOMSON, a subject of the King of Great Britain, residing at Belleville, in the county of Essex and State of New Jersey, have invented certain new and useful Improvements in Machines for Molding Phonograph Records; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in machines for molding phonograph records; and the invention has reference, more particularly, to a novel construction of press, preferably of the hydraulic type, provided with a novel means for holding the matrices and material to be molded therefrom.

The invention has for its principal object to provide in combination with a press, a novel means for expeditiously handling and arranging the matrices and material to be molded with a minimum expenditure of labor, and in such a manner, that while one molding or pressing operation is being carried on, preparation for the next molding or pressing operation may be made without loss of time, so that a rapid successive production of complete finished phonograph records, or other molded products, may be attained.

Other objects of this invention, not at this time more particularly enumerated, will be clearly understood from the following detailed description of the same.

With the various objects of the invention in view, the same consists, primarily, in the novel construction of molding press hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 3:
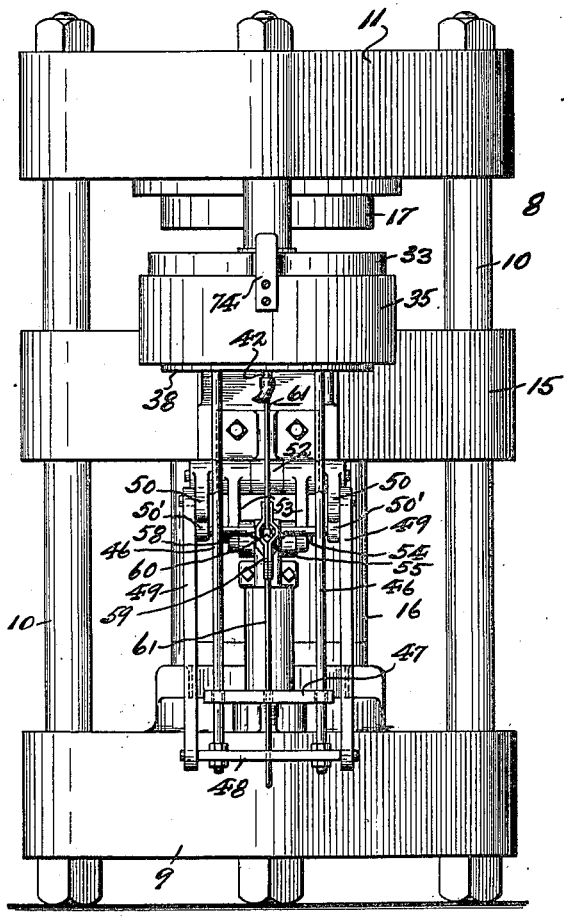
Figure 5:
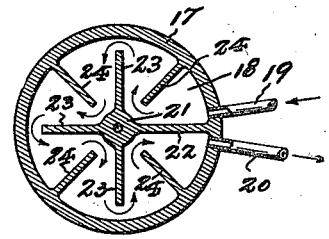
Figure 6:
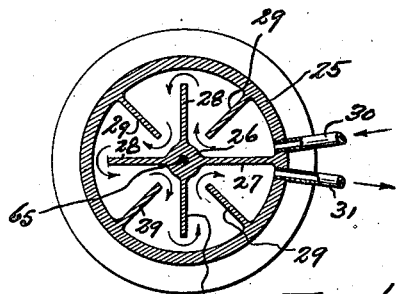
Figure 4:
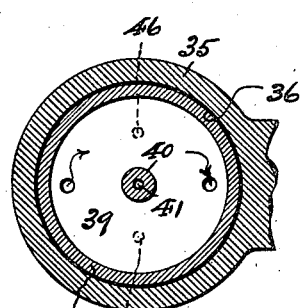

Figure 1 is a side elevation of the novel construction of molding press made according to and embodying the principles of this invention; Figure 2 is a horizontal section, taken on line 2—2 in Figure 1; Figure 3 is a front elevation; Figure 4 is a fragmentary horizontal section taken on line 4—4 in Figure 1; Figure 5 is another fragmentary horizontal section taken on line 5—5 in Figure 1; Figure 6 is still another fragmentary horizontal section, taken on line 6—6 in Figure 1; and Figure 7 is a part side elevation and part vertical section of the press as operated, said view being drawn on an enlarged scale.

Similar characters of reference are employed in all of the hereinabove described views, to indicate corresponding parts.

Referring now to said drawings, the reference character 8 indicates a complete molding press, of the hydraulic type, made according to and embodying the principles of this invention, the same comprising a base 9, from which extend upwardly a plurality of vertical standards or posts 10, to the upper ends of which is secured a head block 11. Said base block is provided with a centrally disposed cylinder chamber 12 which is provided with a suitable inlet passage 13 in communication with the lower end thereof. Fitted into and movable vertically in said cylinder chamber 12 is a piston or ram 14. Slidably supported by and vertically movable upon said standards or posts 10 is a ram block 15, having at its underside a hollow column or stem member 16, to the lower end of which is operatively secured said piston or ram 14. Supported upon the underside of said head block 11 is an upper platen member 17. This platen member is circular in form, and is constructed to provide a hollow or chambered interior 18, which is partitioned in such a manner as to provide a circuitous passage, with one end of which communicates a water feed or intake pipe 19, and the opposite end of which communicates with a water outlet pipe 20. The devices for so partitioning the chambered interior of said upper platen member may be variously constructed and arranged, so long as an efficient distribution and circulation of a cooling fluid therethrough is attained. As shown in the drawings, I prefer to provide the said chambered interior of the upper platen member with a central hub portion 21, between which and the outer wall of said platen member extends a dividing partition 22, so disposed that the fluid intake 19 is at one side thereof and the fluid outlet 20 is at the opposite side thereof. In addition to said partition 22 there are a plurality of radiating baffle walls 23 extending outwardly from said hub 21 but terminating short of the outer wall of the platen member, and a plurality of radiating baffle walls 24 extending inwardly from the outer wall of said platen member but terminating short of said hub 21. The baffle walls 24 are alternated with or disposed intermediate of the baffle walls 23, thereby forming a circuitous passage leading from the fluid inlet 19 to the fluid outlet 20, whereby a cooling fluid is properly circulated and distributed equally throughout the entire interior of said upper platen member.

Supported up the upper side of said ram block 15, and in vertical alinement with said upper platen member 17 is a lower platen member 25 which is also provided with a hollow or chambered interior partitioned by the hub 26, dividing partition 27, outwardly radiating baffle walls 28 and alternated inwardly radiating baffle walls 29, all arranged to provide a circuitous passage, with one end of which communicates a water feed or intake pipe 30, and the opposite end of which communicates with a water outlet pipe 31, whereby a cooling fluid is properly circulated and distributed throughout the interior of said lower platen member.

Rotatably mounted upon the standard or post 10 at the front side of the press is a turn-table 32 having oppositely disposed horizontal mold rings 33, said mold rings having internal annular supporting shoulders 34 in their lower portions.

Fixed upon the forward or front end of said ram block 15 is a forwardly projecting bracket 35 having a vertical guideway 36 therein. Said turn-table 32, with its mold rings 33, is so arranged that when one mold ring is registered between and alined with the upper and lower platen members 17 and 25, the opposite mold ring is registered above and alined with the guideway 36 of said bracket 35. In order to assure the proper positioning of the turn table after operation so that the above described disposition of the respective mold rings is assured, a yieldable stop-latch device 37 is fixed to the rear side of said ram block 15 in proper position to engage in a stop-notch 37' which is provided upon the outer end of each mold ring.

The reference character 38 indicates an ejector plunger vertically movable in said guideway 36 of said bracket 35. Said ejector plunger comprises a hollow body providing an interior chamber 39, through the center of which extends a vertical hub portion 40 having a central vertical longitudinal guideway 41. Said ejector plunger is provided on its underside with an inlet nipple 42 communicating with said interior chamber 39, and also with an outlet nipple 43 leading from said chamber 39. Said inlet nipple 42 is connected with a flexible hose 44 leading from a source of steam supply, and said outlet nipple 43 is connected with a flexible hose 45 forming a steam return line, all so arranged that steam, or any other suitable heating agent may be circulated through the interior chamber 39 to keep the upper surface of said ejector plunger hot, for purposes subsequently described.

Said ejector plunger is supported from its underside by vertical carrying rods 46 suitably secured thereto, and which extend downwardly through a fixed guide bracket 47, which is supported from the lower end of the forward standard or post 10. The lower ends of said carrying rods 46 are fixed to a transverse thrust plate 48. Said thrust plate 48 is suspended by interconnecting links 49 from the free ends of a pair of forwardly projecting lever arms 50. The inner ends of said lever arms 50 are fixed upon a lateral shaft 51 which is journaled in a bearing member 52 rigidly connected with the forward end of said ram-block 15. Also fixed upon said shaft 51 is a pair of depending arms 53, between the free ends of which is carried an axle member 54 upon which is rotatably mounted an anti-friction roller 55. Rigidly secured to said forward post or standard 10, below said ram block 15, is a stationary fixture 56, upon the forward side of which is an upwardly and outwardly inclined cam-block 57 against which said anti-friction roller 55 rides. Said lever arms 50 are provided intermediate their ends with perforate ears 50' for supporting the ends of a transverse fulcrum shaft 58 for extension between said lower arms. Pivoted upon said fulcrum shaft 58 is a hand lever 59. Said hand lever 59 is provided with a pivotally mounted knuckle piece 60 to which is secured a vertical center post rod 61 the upper free end of which rides in said guideway 41 of the hub portion of said ejector plunger 38. The lower end of said center post rod 61 extends downwardly through said guide bracket 47 so as to be guided thereby during its vertical longitudinal movements. The inner end 62 of said hand lever is normally held by a pull spring 63 against a stationary stop 64 which is secured in connection with said stationary fixture 56.

The hub portion 26 of said lower platen member 25 is provided with a central vertical guideway in which is normally disposed the upper end of a center post rod 65. Said center post rod 65 extends downwardly through said ram-block 15 and through the interior of said column or stem 16. Said column or stem 16 is provided in its side wall with a suitably located elongated opening or slot 66. Pivotally secured to one of the rear standards or posts 10 is a swinging arm 67 the free end of which passes through said opening or slot 66 into the interior of said column or stem 16. The lower end of said center post rod 65 is pivotally secured to the free end of said swinging arm 67 by a suitable slot and pin connection, whereby upward swinging of said arm 67 will transmit vertical longitudinal lifting movement to said center post rod. The means for producing the upward swinging movement of the arm 67 at a proper time comprises an actuating lever 68 pivotally connected with a fulcrum bracket 69 secured upon the under side of said ram block 15. The inner end of said actuating lever 68 passes through an elongated opening or slot 70 formed in the wall of said column or stem 16 so as to enter the interior of the latter, to extend beneath the free end of said swinging arm 67 and thereby support the latter. The outer end of said actuating lever is formed to provide a cam nosing 71 which cooperates with a stationary cam piece 72 secured upon the inner side of said stationary fixture 56. Normally said cam-nosing 71 is engaged beneath the under side or lower edge of said cam piece 72 to thereby hold the actuating lever 68 in a depressed position whereby the swinging arm 67 is held in downwardly depressed position to in turn hold the upper end of said center post rod normally withdrawn downwardly into the lower platen member 25. The hub 21 of said upper platen member 17 is also provided with a central vertical guideway, into which at proper times, the upper end of said center post rod may enter. Secured to the lower side of said ram-block 15 is a downwardly projecting tapping-lug 73 which is alined with said swinging arm 67 so that at proper times it may be caused to strike down upon the latter.

Connected with said bracket 35 is a lug 74 having an inwardly off-set 75 beneath which the outer edge of a mold ring passes, when the latter is registered with the ejector plunger 38. This nosing engages and braces the mold ring against undue upward strains, when the ejector plunger operates to remove a molded article and the matrices forming the latter, after the molding operations have been completed.

Having thus described in detail the mechanism comprising my novel molding press, I will now briefly describe the method of operating the same.

As is well known phonograph records comprise a disc of plastic material in one or both faces of which are impressed either the "lateral cut" or "hill and dale" depressions corresponding to the sound vibrations to be reproduced. A matrix is produced from a master record, said matrix having on its surface the relief or negative projections corresponding to the depressions to be formed in the record material. These matrices are made of metallic material. The plastic material of which the record disc is made must be worked while hot, since the heat keeps the same soft and impressionable. This plastic material may be coated upon a suitable base such as card-board, or the record disc may be made entirely of the same.

My novel molding press is designed in such a manner that while one mold ring is supporting matrices on material in registration with the platen members, so that the latter are operated to apply the molding pressure thereto, the other mold ring is registered with the ejector plunger which operates to remove a previously molded or finished record therefrom, so that the operator may reload the mold ring with fresh material, thus while one record is molded and cooled to set the same, preparation for a succeeding molding operation is being carried on without loss of time. Assuming then that the operations have been thus carried on, and the ram block 15 lowered to normal initial position, one mold ring will contain a finished record, and the other mold ring will be charged with fresh material comprising a bottom matrix M supported on the annular shoulder 34 of the latter mold ring, and a top matrix M' together with an intermediate layer of material R to be molded. The turn-table 32 is thereupon rotated to swing the newly charged mold ring into alinement with the platen members of the press, and simultaneously carry the mold ring containing the finished record over the bracket 35 and into alinement with the ejector plunger 38. The press is now ready to be operated and to this end water is forced into the cylinder 12 to cause an upward movement of the piston or ram 14 which in turn moves upwardly the ram-block 15. The upward movement of the ram-block carries with it the lower platen-member 25, which is thus caused to engage the bottom matrix M, whereupon the turn table 32 with the mold rings 33 are likewise moved upwardly until the upper matrix M' is engaged by the upper platen member 17. The contained pressure exerted by the above described movement results in the compacting of the record material R between the matrices, and the impression in the warm and soft record material R of the record depressions. Since the respective upper and lower platen members 17 and 25 are cooled by the circulation of water or other cooling agency therethrough, it follows that after the desired impressions are made in the record material, the matrices M and M' and the record material itself begin to cool by reason of the contact therewith of the cold platen members, and consequently the molded or impressed record material is hardened or set. Since each record must possess a central hole to receive the post of the phonograph turn-table when the record is used, means are provided to assure the proper location and formation of said hole, so that the same is not obstructed by forcing the soft record material thereinto when the pressing operation occurs. This means consists in the center post rod 65 and actuating means therefor. When the ram-block 15 rises the actuating lever 68 pivotally connected with the underside thereof is also moved upwardly, whereby its cam nosing 71 immediately rides up on to the vertical face of said cam piece 72, thus causing an upward swing of the inner end of said actuating lever immediately the said upward movement of the ram-block is initiated. The upward swinging of the actuating lever 68 throws up the swinging arm 67 and thereby thrusts upwardly through the lower platen member 25, and through the matrices M and M' and intermediate record material the upper end of said center post rod, which thereupon enters the guideway 21', of the upper platen member 17. As thus positioned the center post rod acts as a core for the formation or maintenance of the hole in the record while the material R is subjected to molding pressure.

While the molding operation as to the one mold ring is thus carried on, another operation occurs with respect to the other mold ring, whereby the removal therefrom of the matrices and previously finished record disc is effected. As the ram-block 15 rises it causes the anti-friction roller 55 to ride upwardly over the cam-block 57 thereby swinging outwardly the arms 53 to transmit an upward swing to the lever arms 50. The upward swing of the lever arms 50 lifts, through the links 49 the thrust plate 48, which in turn, acting through the carrying rods 46 causes an upward vertical movement of the ejector plunger 38, whereby the same engages the bottom matrix M so as to thrust or lift the same, together with the upper matrix M' and the intermediate finished record, out of the mold ring. Since the hand lever 59 has its inner end normally engaged with the stationary stop 64, said stop acts as a fulcrum and the shaft 58 upon which the lever is pivoted acts as a point of power application, whereby when the lever arms 50 swing upward the hand-lever 59 is swung upwardly from its inner end as a fulcrum. The increased arc of swing thus resulting as to the hand-lever movement, causes said hand-lever to move the center-post rod 61 upward for a greater distance than the ejector plunger moves, consequently, the upper free end of the former is projected above the upper surface of the latter, and through the matrices and finished record. In order to permit the matrices and finished record to be slid off of the ejector plunger after being raised out of the mold ring, the center post rod must be retracted without disturbing the raised position of the ejector plunger. This is accomplished by grasping the outer end of the hand-lever and pushing it downward, thereby rocking the same on the fulcrum shaft 58, the inner end of the hand-lever swinging upward against the tension of the pull spring 63 away from the stop 64. This movement of the hand-lever produces an independent downward movement of the center post rod, which retracts the same below the surface of the ejector plunger, thus permitting the matrices and record to be slid away, after which, the center-post rod is returned to its upwardly projected position by releasing the hand-lever to allow the pull spring 63 to again return the inner end of the lever in contact with the stop 64. Since the center-post rod now serves to center and correctly position on the upraised ejector plunger the next pair of matrices with intermediate material R to be molded, since the ejector plunger 38 is kept hot by the circulation of steam or other heating agency therethrough, the new matrices and material R is kept warm pending the transfer thereof to the molding position.

When the molding operation is complete, the water or other fluid is discharged from the cylinder 12 to permit the descent of the ram or piston 14 and the ram block 15, whereby the latter with associated parts are lowered to normal initial position. In thus descending the ram-block 15 carries downward the actuating lever 68 until its cam-nosing 71 again passes beneath the cam-piece 72, whereupon the said actuating lever 68 is depressed to normal initial position. Since, however, the mold record material usually hugs tightly around the center post rod 65, the latter is thereby held against immediate retraction, but as the ram-block 15 continues its downward movement the tapping lug 73 is carried into engagement with the up swung arm 67, and in thus striking the same loosens the bound center post rod so that it drops back to normal initial position.

The downward descent of the ram block 15 also causes the anti-friction roller 55 to ride downward on the cam-block 57, thereby permitting the arms 53 to swing rearwardly and the lever arms 50 to swing downwardly to normal initial position, so that through the reverse operation of the associated parts the ejector plunger 38 moves downwardly to carry the new matrices and material to be molded into the mold ring, whereby the latter is freshly loaded or charged, while at the same time the center post rod 61 is retracted below the surface of the ejector plunger.

The turn-table 32 is now ready to be again rotated to reverse the positions of the respective mold rings, so that the above described operations may be repeated.

As shown and described the turn table possesses two opposed mold rings, but it will be clearly understood that if desired the number of mold rings radiating from the turn-table may be increased beyond two.

I am aware that some changes may be made in the various arrangements and combinations of the devices and parts, as well as in the details of the construction of the same, without departing from the scope of this invention as set forth in the foregoing specification, and as defined in the appended claims. Hence, I do not limit my invention to the exact arrangements and combinations of the various devices and parts as described in said specification, nor do I confine myself to the exact details of the construction of said parts as illustrated in the accompanying drawings.

I claim:—

1. In a device of the kind described, a base, a head block, standards intermediate said base and head block, a ram device vertically movable on said standards intermediate said base and head block, means for operating said ram device, platen means connected with said head block and ram device for engaging the work to be pressed, an outwardly off-set bracket having a guideway connected with said ram device, an ejector plunger vertically movable in said bracket guideway, a turn-table rotatable on a standard above said ram device, said turn-table having a plurality of work supporting mold rings, normally alined respectively with said platen means and said ejector plunger, and means operated by the upward movement of said ram device for raising said ejector plunger through the mold ring alined therewith, a center post rod movable upwardly through said platen means, means operated by the upward movement of said ram device for raising said center post rod to operative position, a second center post rod movable upwardly through said ejector plunger, and means cooperating with said ejector plunger actuating means for raising said second center post rod to operative position.

2. In a device of the kind described, a base, a head block, standards intermediate said base and head block, a ram device vertically movable on said standards intermediate said base and head block means for operating said ram device, platen means connected with said head block and ram device for engaging the work to be pressed, an outwardly off-set bracket having a guideway connected with said ram device, an ejector plunger vertically movable in said bracket guideway, a turn-table rotatable on a standard above said ram device, said turn-table having a plurality of work supporting mold rings normally alined respectively with said platen means and said ejector plunger, and means operated by the upward movement of said ram device for raising said ejector plunger through the mold ring alined therewith, a center post rod movable upwardly through said platen means, means operated by the upward movement of said ram device for raising said center post rod to operative position, a second center post rod movable upwardly through said ejector plunger, means co-operating with said ejector plunger actuating means for raising said second center post rod to operative position, and means rendering said second center post rod retractable independently of the retraction of said ejector plunger.

3. In a device of the kind described, a head block, standards intermediate said base and head block, a ram device vertically movable on said standards intermediate said base and head block, means for operating said ram device, platen means connected with said head block and ram device for engaging the work to be pressed, an outwardly off-set bracket having a guideway connected with said ram device, an ejector plunger vertically movable in said bracket guideway, a turn-table rotatable on a standard above said ram device, said turn-table having a plurality of work supporting mold rings normally alined respectively with said platen means and said ejector plunger, and means operated by the upward movement of said ram device for raising said ejector plunger through the mold ring alined therewith, a center post rod movable upwardly through said platen means, means operated by the upward movement of said ram device for raising said center post rod to operative position, a second center post rod movable upwardly through said ejector plunger, means cooperating with said ejector plunger actuating means for raising said second center post rod to operative position, means rendering said second center post rod retractable independently of the retraction of said ejector plunger, means for cooling said platen means, and means for heating said ejector plunger.

4. The combination with a press and its movable ram, of a forwardly off-set bracket having a guideway carried by said ram, an ejector plunger vertically movable in said guideway, a horizontal turn-table having oppositely located work supporting rings so arranged that as one ring is moved into operative relation to said press the opposite ring moves into alinement with said ejector plunger, means for supporting said ejector-plunger, a lever mechanism pivotally mounted on said ram and interconnected with said ejector plunger supporting means for actuating said plunger, a fixed cam means for actuating said lever mechanism coincidently with the strokes of said ram, a vertically movable center post rod associated with said press, means operated by the movement of said ram for raising and lowering said center post rod to operative position, a second center post rod movable upwardly through said ejector plunger, a hand-lever pivotally supported in connection with said lever mechanism to which said second center post rod is attached, a fixed stop engaging the inner end of said hand-lever, and a spring means holding said hand lever yieldably engaged with said stop.

5. The combination with a press and its movable ram of a stationary upper platen member, and a lower platen member movable by said ram, a forwardly off-set bracket having a guideway carried by said ram, an ejector plunger vertically movable in said guideway, a horizontal turn-table having oppositely located work supporting rings so arranged that as one ring is moved into position between said platen members the opposite ring moves into alinement with said ejector plunger, a stop latch means for holding said turn-table in operative position, means for actuating said ejector plunger coincidently with the strokes of said ram, a vertically movable center post rod associated with said ejector plunger, means associated with said ejector plunger actuating means for operating said center-post rod, another center-post rod vertically movable through said platen-members, and means for operating said last mentioned center post rod coincidently with the strokes of said ram.

6. In a device of the kind described, a base, a head block, standards intermediate said base and head block, a ram device vertically movable on said standards intermediate said base and head block, means for operating said ram device, platen means connected with said head block and ram device for engaging the work to be pressed, an outwardly off-set bracket having a guideway connected with said ram device, an ejector plunger vertically movable in said bracket guideway, a turn-table rotatable on a standard above said ram device and said bracket, said turn-table having a plurality of work supporting mold rings, one of which is normally alined with said platen means and another of which at the same time is normally alined with said ejector plunger, vertically movable carrier means to support said ejector plunger, a guide means for said carrier means, a bell-crank lever means fulcrumed on said ram device, link means interconnecting one end of said bell-crank lever means with said carrier means, and a stationary cam block to operatively engage the opposite end of said bell-crank lever means whereby the latter is actuated to operate said ejector plunger coincidently with the upward movement of said ram device.

In testimony that I claim the invention set forth above I have hereunto set my hand this 29th day of October, 1921.

CHARLES A. THOMSON.

Witnesses:
 FREDK. C. FRAENTZEL,
 EVA E. DESCH.